Patented May 26, 1931

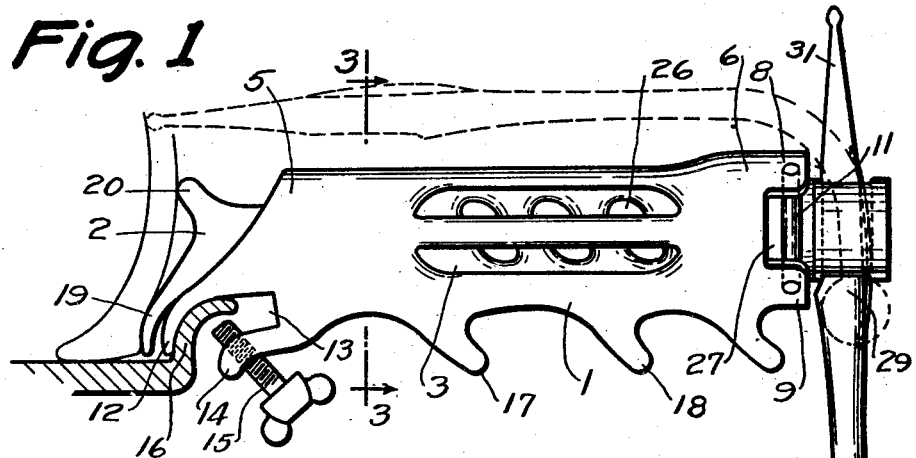

1,806,947

UNITED STATES PATENT OFFICE

INGVALD MJELVA, OF SEATTLE, WASHINGTON

TIRE REMOVING TOOL

Application filed August 13, 1929. Serial No. 385,568.

The invention is a tool that is particularly adaptable for removing tires from rims with a screw jack motion, and which is also adaptable for spreading a tire casing and for removing the rim locking ring.

The object of the invention is to provide a tool by which tire casings may readily be removed from rims or wheels.

Another object of the invention is to provide a tire removing tool with which a considerable amount of force may be applied to the casing without injuring the same.

Another object of the invention is to provide a small, simple and readily operated device for positively forcing tires from rims or the like.

A further object of the invention is to provide a tire removing device which is so constructed that the holding prongs may also be used to spread the tire casing.

A still further object of the invention is to provide a tire removing tool which is so constructed that the handle may be used to remove the locking ring.

And a still further object of the invention is to provide a tire removing tool which is of a simple and economical construction.

With these ends in view the invention embodies a cylindrical casing or handle having prongs at one end which are adaptable to be placed over the side of a motor vehicle wheel rim, a set screw for holding the prongs to the rim, another prong cooperating with the former prongs and having a threaded shank extending into the handle, a sleeve rotatable in the handle and having threads cooperating with the threads of the shank of the prong, and a lever resiliently held in the outer end of the sleeve.

Other features and advantages of the invention will appear from the following description taken in connection with the drawings, wherein:

Figure 1 is a view showing a side elevation of the tool.

Figure 2 is a view showing an end elevation of the tool.

Figure 3 is a cross section through the tool on line 3—3 of Figure 1.

Figure 4 is a longitudinal section through the tool.

Figure 5 is a view showing the method of removing the rim ring by the lever in the sleeve.

Figure 6 is a view showing a portion of the tool as it would be used in spreading a tire casing.

In the drawings the device is shown as it would be made wherein numeral 1 indicates the cylindrical casing or handle, numeral 2 the movable prong, numeral 3 the sleeve, and numeral 4 the lever at the end of the sleeve.

The handle 1 may be made of any suitable design and arranged in any suitable manner. In the design shown the handle is made with a cylindrical casing having a bearing portion 5 at one end and a similar portion 6 at the opposite end. These portions are connected by ribs 7 with openings between them as shown. The portion 6 is provided with overhanging flanges 8 and 9 through which pins 10 and 11 are placed to hold the sleeve in the handle as hereinafter described. At the opposite end of the handle are two downwardly curved prongs 12 with a space between them in which another similar prong as indicated by the numeral 2, is positioned. On the under side of the prongs 12 is a recess 13 with a projection 14 at the lower side in which a thumb screw 15 is threaded, and it will be observed that the thumb screw 15 may be screwed inward to engage and hold a side of a wheel rim which is indicated by the numeral 16. It will be noted that this recess is of sufficient size to receive the side of a rim of any size, and the screw 15 will take up the space when used with very small rims. It is preferable to use the screw 15 in the position shown in Figure 1 so that it does not engage the side of the rim. However, when in this position it will prevent the tool slipping off of the rim. The under side of the handle may be provided with additional projections 17 and 18, which may be used for holding the edges of the tire casing in combination with the prong 2 when it is desired to spread the casing.

The projection 19 at the lower side of the prong 2 is curved similar to the prongs 12 and when in the closed position it will be between these prongs so that the three prongs may readily be forced between the tire casing and side of the rim. The upper side of the prong 2 is also provided with a small projection 20 as shown. The prong 2 is formed at the end of a square shank 21 which extends into the handle to the point 22 when in the position shown in Figure 4, and the square shank is provided with threads 23 with a round core 24 in the center thereof. The threads engage a threaded section 25 at the end of the sleeve 3, and it will be noted that the sleeve 3 is made cylindrical and rotatably mounted in the handle. The sides of the sleeve 3 may be provided with openings as indicated by the numeral 26, if desired. The outer end of the sleeve 3 is provided with a collar 27 which is held by the pins 10 and 11 as hereinbefore described. It will be noted that the thrust in one direction is taken by the collar 27 which transmits this load to the handle and the opposing load which is transmitted from the shank 21 to the sleeve 3 is taken through the threads in the section 25 so that both of these loads are not concentrated at one point, but distributed with one at each end of the handle. Beyond the collar 27 is a hub 28 having an opening therethrough in which the lever 4 is placed. It will be noted that this opening is square and the lever 4 is provided with a square wedge shaped section 29 having a spring 30 at one side which resiliently holds the lever in the opening, and a beveled surface at the other which draws the wedge shaped section of the lever into the opening, and, with the spring holds it firm. The ends of the spring 30 are held in a recess in the square section 29 of the lever 4 and the recess permits the spring to pass within the limits of the lever so that the wedge pressure will be taken against the lever and not by the spring. One end of the lever is provided with a prong 31 which, as shown in Figure 5 may be used for removing the ring at the side of a tire. The prong 31 has grooves in the sides which guide the upper corner of the rim ring as it works out of the rim, as shown in Figure 5, in which it will be noted that the corner of the ring is following up the groove as it is being worked upward. And the opposite end of the lever is made round and of a somewhat smaller size and is also curved as shown in Figure 1 so that it may be passed through the opening and placed in the position shown in dotted lines when it is desired to pack the tool. The outer end of the round curved portion of the lever may be provided with a ball 32 to prevent its passing out of the opening.

It will be understood that changes may be made in the construction without departing from the spirit of the invention. One of which changes may be in the design of the prongs, as it is understood that these may be shaped so that the tool may be used with any type of tire, another may be in the use of other means for holding the tool to the rim, another may be in the use of other means for rotating the screw, and still another may be in the use of other means for forcing the prong out of the handle.

The construction will be readily understood from the foregoing description. In use the tool may be provided as shown, and it will be observed that the prongs 12 and 19 may be started inward between the side of the tire and side of the rim and when the tire is rusted in place the prong 19 may be forced outward slightly and then drawn backward and this operation may be continued until the tire has been forced away from the side a sufficient distance to permit the prongs to be inserted to the position shown in Figure 1. It will be noted that with the screw jack action an enormous pressure may be applied to the tire so that it will be possible to force practically any tire off of the rim. The tool may be used at a plurality of points around the rim to force the different parts of the tire away from the sides. When it is desired to spread a tire casing one of the projections 17 or 18 may be placed over one side of the casing and with the prong 2 against the opposite side the prong 2 may be screwed outward so that the sides of the casing may be separated as far as desired. The use of the tool 31 on the lever 4 is illustrated in Figure 5, and it is understood that this may be inserted in the opening at one end of the ring and used to force the ring off the rim.

Having thus fully described the invention, what I claim as new and desire to secure by Letters Patent, is:

1. In a portable, self-contained tire removing tool, a tubular outer casing forming a handle by which the tool may be held in one hand, a rotatable tubular sleeve extending into the said casing and having threads on the interior of the inner end, a handle extending through the outer end of the said sleeve, a square shank extending through a square opening in the opposite end of the casing and having a downwardly extending curved prong at the outer end thereof, said shank having a screw on the inner portion and screwed into the inner end of the said sleeve, downwardly extending curved prongs at the end of the casing corresponding with and parallel to the prong of the said shank, said casing being relieved behind the said prongs forming a recess to receive a flange at the edge of a rim upon which a tire may be held, a projection at the opposite side of the said recess corresponding with the shape of the prongs, and a plurality of opposed lugs adapted to cooperate with the said projection and prongs to spread a tire and also spaced on the said casing to facilitate gripping.

2. In a tire removing tool, a tubular casing, a rotatable sleeve extending into the casing from one end, a screw extending into the casing from the opposite end, said sleeve having threads in the inner end engaging said screw for moving the screw outward and inward as the sleeve is rotated, a downwardly curved prong at the outer end of said screw, similar prongs on the said casing and positioned on each side of said screw prong, said casing relieved behind said prongs providing a recess for the flange at the end of a rim, and opposed lugs on the side of said tubular casing adapted to cooperate with said prongs to spread a tire and also positioned to facilitate gripping the said casing.

3. A portable self-contained tire removing tool comprising a plurality of parallel prongs, a screw upon which one of the prongs is mounted, a tubular casing enclosing said screw and upon which the remaining prongs are mounted, said casing having lugs on one side opposed to said prongs and positioned to be located between the fingers of the hand to facilitate gripping, and a sleeve with threads at the inner end cooperating with the screw and extending into the casing from the end opposite to the screw.

In testimony whereof he affixes his signature.

INGVALD MJELVA.